United States Patent [19]

Ochiai

[11] Patent Number: 5,181,978
[45] Date of Patent: Jan. 26, 1993

[54] TIRE AND RIM ASSEMBLY WITH THE TIRE HAVING 15 DEGREE TAPER BEAD PARTS

[75] Inventor: Kiyoshi Ochiai, Kobe, Japan

[73] Assignee: Sumitomo Rubber Industries, Ltd., Kobe, Japan

[21] Appl. No.: 617,093

[22] Filed: Nov. 23, 1990

[30] Foreign Application Priority Data

Nov. 25, 1989 [JP] Japan ................. 1-305727
Oct. 15, 1990 [JP] Japan ................. 2-276700

[51] Int. Cl.⁵ ............................. B60C 15/06
[52] U.S. Cl. ......................... 152/541; 152/543; 152/546
[58] Field of Search ............. 152/539, 543, 546, 541

[56] References Cited

U.S. PATENT DOCUMENTS

| | | | |
|---|---|---|---|
| 4,215,737 | 8/1980 | Motomura et al. | 152/546 |
| 4,699,194 | 10/1987 | Iuchi | 152/546 |
| 4,705,091 | 11/1987 | Iuchi | 152/546 |
| 4,726,408 | 2/1988 | Alie et al. | 152/546 |
| 4,953,605 | 9/1990 | Kawamura et al. | 152/546 |

FOREIGN PATENT DOCUMENTS

| | | |
|---|---|---|
| 54-13108 | 1/1979 | Japan . |
| 60-6803 | 2/1985 | Japan . |
| 60-94806 | 5/1985 | Japan . |
| 63-87304 | 4/1988 | Japan . |

Primary Examiner—Michael W. Ball
Assistant Examiner—Nancy T. Krawczyk

[57] ABSTRACT

A tire and rim assembly including a flanged rim and a tubeless tire with 15° taper bead parts. The tire includes a carcass having a main body portion extending from a tread part through sidewall parts to the bead parts and turned up portions each turned up around a bead core of the bead part from axially inside to outside. In each bead part, a first reinforcement layer of steel cords and a second reinforcement layer of steel cords are provided. The first reinforcement layer has an inside part extending along the inside surface in the axial direction of the body portion, and an outside part contiguous to the inside part and extending along the outside surface in the axial direction of the turned up portion. The second reinforcement layer extends from a radial position substantially level with the bead heel end and is interposed between the inside part and the main body portion along the main body portion so as to form an overlapping portion with the inside part.

Further, the width of the overlapping portion is in a range of 0.3 to 0.5 times the height H3 of the upper end of the second reinforcement layer, the height H1 of the upper end of the turned up portion is in a range of 2.7 to 4.0 times the flange height HF of the rim flange, the height H2 of the upper end of the inside part is in a range of 1.5 to 2.4 times the flange height HF, and the ratio H3/H1 is in a range of 1.2 to 1.6.

1 Claim, 6 Drawing Sheets

Height ratio

FIG.4

Rubber thickness ratio

TIRE AND RIM ASSEMBLY WITH THE TIRE HAVING 15 DEGREE TAPER BEAD PARTS

The present invention relates to a tire and rim assembly having a tubeless tire with 15 degree taper bead parts improved in the durability of the bead part, by determining the ratio of the inside and outside rubber thickness at the turned up end of a carcass, employing first and second reinforcement layers of steel cords inside and outside the carcass, defining their height position, and overlapping the inside part of the first reinforcement layer and the lower part of the second reinforcement layer.

BACKGROUND OF THE INVENTION

Figure 6:
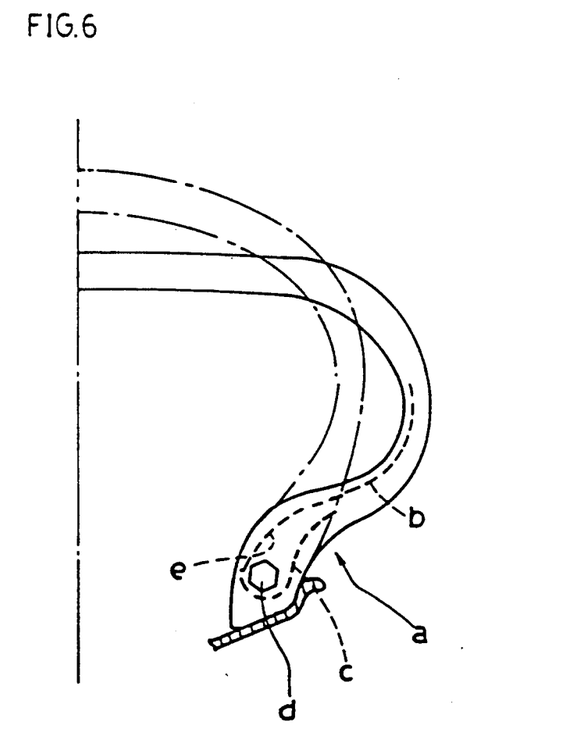
FIG. 6 is a sectional view showing the action of bending force on a bead part.

A tire for carrying heavy load such as a truck or a bus, the use of a so-called tubeless tire is spreading widely. In such a tubeless tire, as compared with the general tube type tire, such tubeless tire is joined to the rim with a strong bond. Therefore, when a load is applied to the tire, as shown in FIG. 6, a larger bending force occurs in the bead part (a), causing a tensile force inside and a stress of compression outside. When the carcass (b) is exposed to such bending force, the turned up portion (c) of the carcass (b) is pulled toward the main portion (e) side of the carcass (b), like both ends of a rope on a pulley, around the bead core (d), and is dislocated.

To prevent such movement of the carcass (b), hitherto, as shown in FIG. 5 (b), the front end of the turned up portion (c) of the carcass (b) is positioned on the bending neutral line of the bead part (a), and the carcass (b) is reinforced by covering the outside of the carcass (b) with a filler (f) made of organic fiber cords. On the other hand, prior arts of the reinforcing structure of the 15 deg. taper bead are disclosed in the Japanese Laid-open Patent Nos. 60-94806, 54-13108, and the Japanese Patent Publication No. 60-6803, among others, and various proposals have been made for the appropriate arrangement method of nylon filler and steel filler, suited hardness of apex rubber, and other proposals.

Figure 5A:
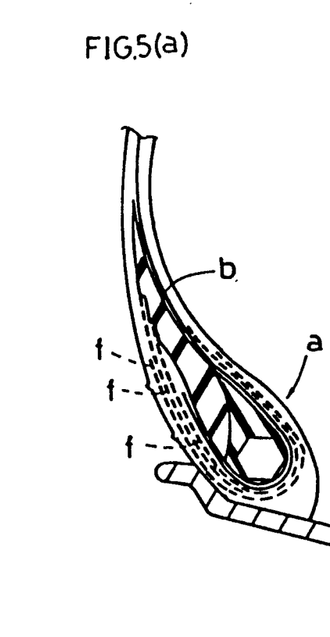
Figure 5B:
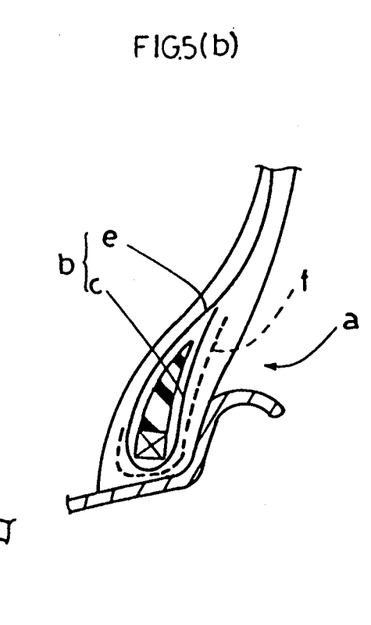
Figure 5C:
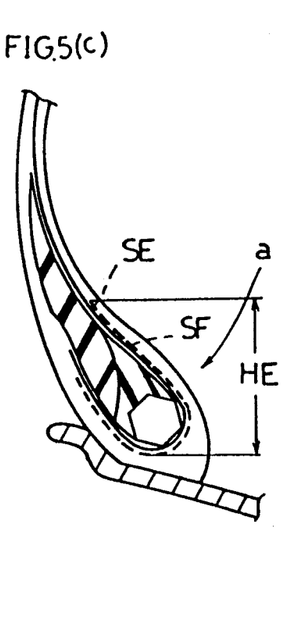

In this case, when reinforcing the turned up portion of the carcass ply with the nylon filler alone, the strength is insufficient with one filler, therefore two to four fillers are overlaid to achieve a desired reinforcement effect (FIG. 5a). Or when using a steel filler, a certain reinforcement effect is obtained when using one filler. Therefore, usually one filler is used (FIG. 5c), or in order to further enhance the reinforcement effect, the combination of two nylon fillers and one steel filler is most widely employed.

Figure 5D:
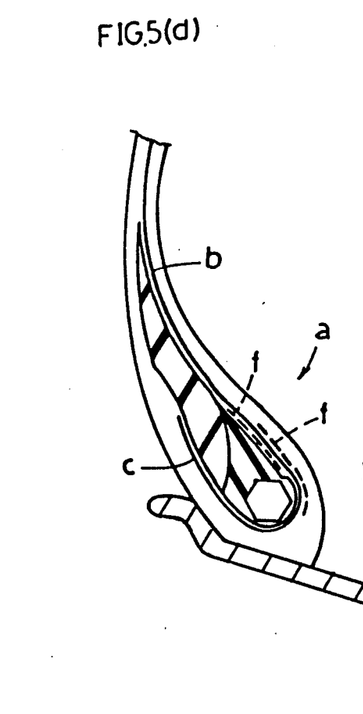
Figure 5E:
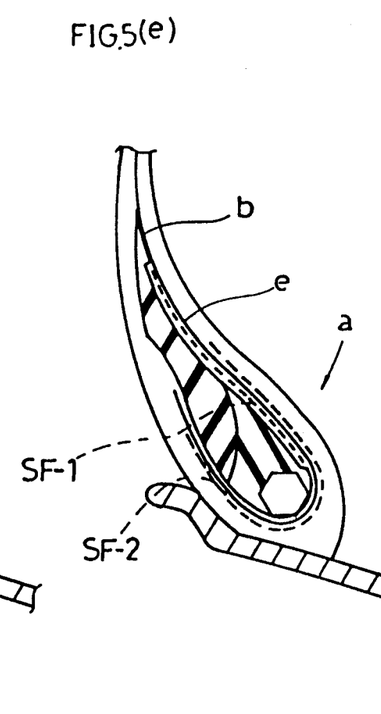
Figure 5F:
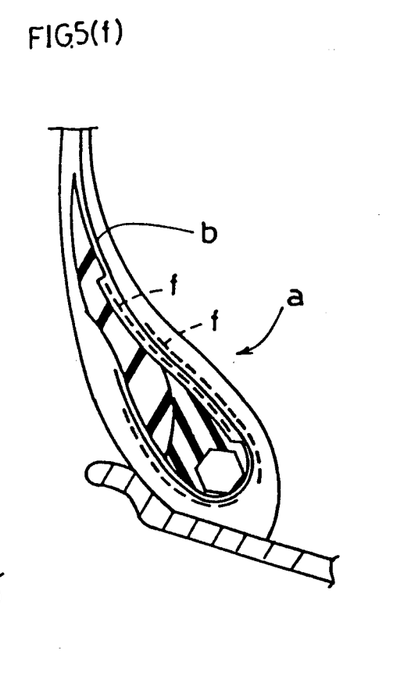

Moreover, according to the Japanese Laid-open Patent No. 63-87304, it is proposed to dispose a first reinforcement layer of steel filler between the bead apex rubber and carcass main portion, and a second reinforcement layer of steel filler overlapping with the first reinforcement layer through the carcass main portion, at the inner side of the tire as shown in FIG. 5(d)~(f).

Moreover, in the Japanese Laid-open Patent No. 60-94806, a rubber band of high elasticity is employed between the carcass main portion and a bead apex rubber. This is based on the consideration that as the tire is deformed in a convex form projecting to the outside in the axial direction of the tire from the side wall to the bead part when loaded, the bead upper part is deformed flexibly so as to overhang the rim flange part. And in this time, the cord gap (the gap between two adjacent cords) of the carcass main portion is forced to be extended. In cooperation with this movement, the turned up portion of the carcass ply and the steel filler reinforcement layer are pushed to the outside in the tire axial direction. As this flexing is repeated periodically, the temperature of the bead part rises. That is, the rubber of the bead part is always exposed to dynamic and thermal fatigue. Accordingly, as the means for preventing widening of the cord gap of the carcass ply main portion and restricting the temperature rise of the bead part, in the Japanese Laid-open Patent No. 60-94806, the "rubber band of high elasticity" is employed at the outside of the carcass main portion in the tire axial direction, that is, at the boundary of the bead apex. Such employment suppresses the widening of the cord gap. And using a rubber layer of a small hysteresis loss in the bead apex inhibits heat generation.

However, in the method of reinforcement of the bead part by nylon fillers alone, the number of fillers increases, so that the weight increases and productivity is restricted.

And along with the increase of the wall thickness of the bead part, there is a limit due to heat generation of the tire arising from running.

The reinforcement of the bead part by the combination of steel filler and nylon filler is also limited in the improvement of durability because of the increase of weight and the problem in productivity.

When only the steel filler is used, a certain reinforcement effect is obtained by one filler and there is no problem in weight and productivity. But the bead part is tilted toward the outer side in the tire axial direction when inflated with internal pressure and when loaded. As the result, strain concentration increases at the terminus of turnup of steel filler or carcass ply. As a result, separation from the surrounding rubber occurs, and notable improvement of durability is not expected.

Accordingly, to prevent tilting of the bead part, as shown in FIG. 5 (c), it is intended to enhance the durability by restricting the movement of the bead part when inflated with internal pressure and when loaded, by raising the height HE of the upper terminal SE of the inside of the tire of the steel filler SF. But this means is also limited because if the height HE of the upper terminal SE is raised too much, a crack may be formed at the tire inside upper terminal SE of the steel filler SF and this crack may propagate into the inner liner to allow air to invade, finally leading to problems.

Among the aforementioned method of reinforcement for sandwiching the carcass main portion from both side with the steel filler at the bead part (the Japanese Laid-open Patent No. 63-87304), in the method shown in FIG. 5 (d), since the turned up portion (c) of the carcass ply is not reinforced by the steel filler, problems due to rim deviation are likely to occur. In the structure shown in FIG. 5 (e), there is a loop arrangement of the second reinforcement layer SF-2 from axially inside to outside of the bead part. In this case, rim deviation may be prevented, but the inside region of the second reinforcement layer SF-2 is pulled to the lower side in the radial direction, while the adjacent carcass ply main body portion (e) is pulled to the upper side in the radial direction. Therefore shearing strain is likely to occur at the interface of the two, thereby resulting in peeling trouble between the second reinforcement layer SF-2 and the carcass ply main portion (e). In the structure in FIG. 5 (f), rim chafing damage is likely to be induced at the bead base side.

Furthermore, in the structure disclosed in the Japanese Laid-open Patent No. 60-94806, it is expected to enhance the durability more than the conventional tire, but in the "rubber band with high elasticity," widening of the cord gap at high load cannot be suppressed sufficiently.

SUMMARY OF THE INVENTION

The present invention is achieved after intensive studies for solving the above problems.

It is hence a primary object of the invention to provide an excellent pneumatic tubeless tire for heavy load capable of greatly enhancing the durability of the bead part by restricting the tilting of the bead part in running, without increasing the tire weight or impeding the tire productivity, by improving the structure of the bead part.

According to one aspect of the present invention, a tubeless tire with 15° taper bead parts, comprising;
- a carcass having a main body portion extending from a tread part through sidewall parts to a bead core in each of said bead parts, and turned up portions each turned up around the bead core from axially inside to outside of a tire and extending outwardly in the tire radial direction;
- a first reinforcement layer of steel cords having an inside part extending at the bead part along the inside surface of the main body portion of the carcass, and an outside part contiguous to the inside part and extending along the outside surface of the turned up portion of the carcass; and
- a second reinforcement layer of steel cords extending outwardly in the tire radial direction along the main body portion of the carcass from a radial position substantially level with the bead heel end, and of which lower region is intervening between the inside part of the first reinforcement layer and the main body portion of the carcass so as to form an overlapping portion with the inside part of the first reinforcement layer, wherein
- the width l of the overlapping portion is in a range of 0.3 to 0.5 times the height of the front end of the second reinforcement layer in radial direction from the bead heel end,
- the height of the front end of the turned up portion of the carcass in radial direction from the bead heel end is in a range of 2.7 to 4.0 times the flange height HF of the rim,
- the height of the front end of the inside part of the first reinforcement layer in the radial direction from the bead heel end is in a range of 1.5 to 2.4 times the flange height HF, and
- the ratio $H3/H1$ of the height $H3$ to the height $H1$ is in a range of 1.2 to 1.6.

In such a tire, preferably, the thickness $G1$ of the intermediate part rubber which is the length between the front end of the turned up portion of the carcass and the main body portion in the direction orthogonal to the turned up portion is in a range of 0.9 to 1.1 times the flange height HF, and the ratio $G1/(G1+G2)$ of the thickness $G1$ of the intermediate part rubber to the sum of the intermediate part rubber thickness $G1$ and the outside rubber thickness $G2$ which is the length from the front end of the turned up portion to the outside surface of the bead part in the direction orthogonal to the turned up portion is in a range of 0.50 to 0.60.

In the bead part, since the first reinforcement layer made of steel cord is continuously reinforcing the region from the main body portion of the carcass to the outside of the turned up portion through the bead base part, damages such as rim chafing may be prevented. In addition, the second reinforcement layer, which extends along the main body portion of the carcass from the height position of the bead heel end at a height of $H3$ of 1.2 to 1.6 times the height $H1$ of the terminal end of the turned up portion of the carcass ply, is disposed interveningly between the main body portion and the first reinforcement layer. Therefore, even if the carcass ply is flexed so as to overhang on the rim flange, extension of the gap between the cords is inhibited. And the interlayer separation due to interlayer shearing strain arising from a difference in the force acting direction between the first reinforcement layer and the main body portion of the carcass in the prior art is prevented by the intervening second reinforcement layer between the two. Still more, since the steel cords are used in the first and second reinforcement layers, the rigidity of the reinforcement layer is enhanced, and the movement of the carcass may be more effectively prevented.

When the height $H1$ of the front end of the turned up portion of the carcass is set higher than the front end of the first reinforcement layer, and the rubber thicknesses $G1$, $G2$ of inside and outside at the front end of the turned up portion are defined, separation of the front end due to repeated deformation of the bead part may be effectively prevented.

In addition, the front end height $H3$ of the second reinforcement layer is set higher than the height $H1$ of the front end of the turned up portion and its ratio is defined, so that moving or tilting of the front end part of the turned up portion of the carcass may be prevented by the second reinforcement layer when the tire is deformed. As the result, the peeling of the front end of the turned up portion may be more effectively prevented.

When the composition of this application mentioned above is organically combined, separation of the front end of the turned up portion of the carcass may be prevented, and durability of the bead part may be enhanced.

BRIEF DESCRIPTION OF THE DRAWINGS

An embodiment of the present invention will now be described by way of example, referring the attached drawings, in which.

DETAILED DESCRIPTION OF THE INVENTION

Figure 1:
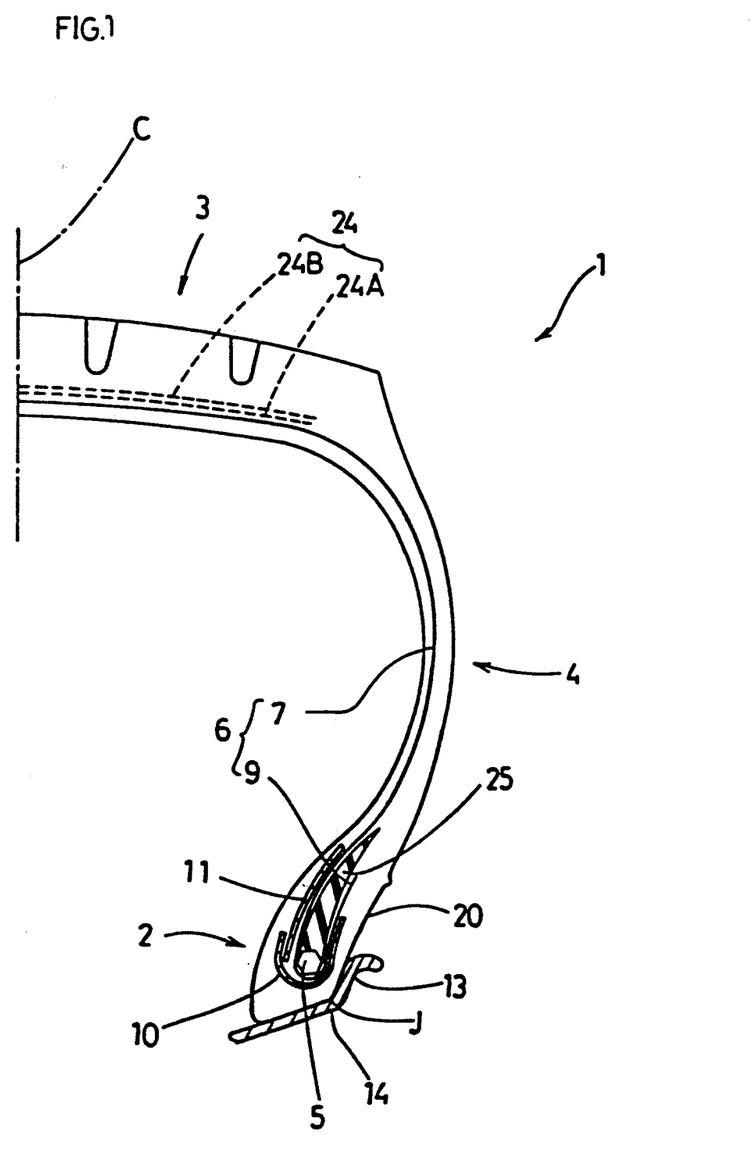
FIG. 1 is a sectional view showing an embodiment of the invention.
Figure 2:
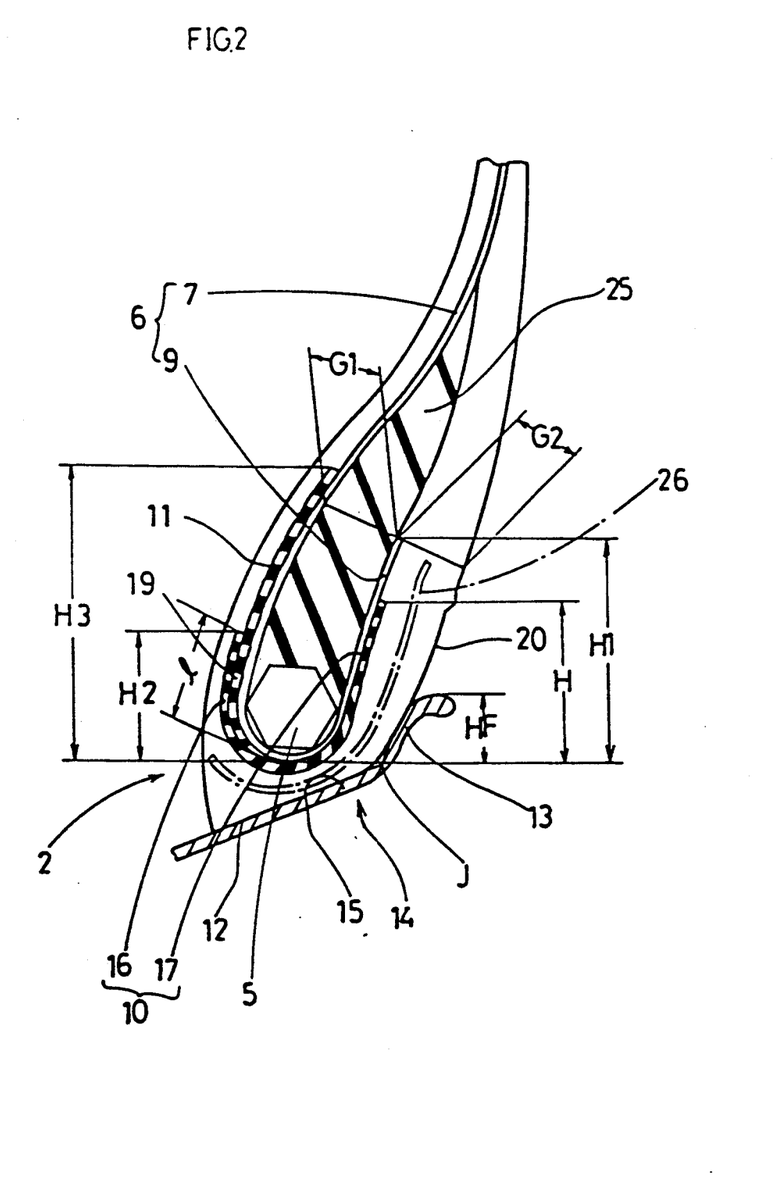
FIG. 2 is a sectional view magnifying the bead part.

In FIG. 1 showing schematically a tubeless tire 1 and in FIG. 2 showing the bead part 2 in detail, the tubeless tire 1 comprises a carcass 6 extending from a tread part 3 through sidewall parts 4 and folded around a bead core 5 in each of two bead parts 2, and a reinforcement layer consisting of a first reinforcement layer 10 and a second reinforcement layer 11 each disposed outside the carcass 6 of the bead part 2.

The carcass 6 is composed of at least one carcass ply which includes carcass cords arranged in parallel to each other at an inclination angle of 60 to 90 degrees to the equator C of the tire. And the carcass cords are made of organic fibers such as aromatic polyamide, rayon, nylon and polyester, carbon fiber, glass fiber, or steel or other metal wire.

In this embodiment, inside the tread part 3 and outside in the radial direction of the carcass 6, a belt layer 24 composed of plural belt plies 24A, 24B are disposed. The belt plies 24A, 24B are to reinforce the tread part 3 by arranging the belt cords made of approximately the same material as the carcass cords in the directions of crossing with the carcass cords.

In this embodiment, moreover, a bead apex rubber 25 extending from the bead core 5 to the outside in the radial direction of the tire is provided at the bead part 2.

The bead part 2 has a base bottom surface 12 reducing its inside diameter with a taper of 15 degrees from a heel end J inward in the axial direction of tire. And this base bottom surface 12 is seated on the bead seat part 15 of the rim 14 having a rim flange 13 contacting with the outside surface of the bead part 2.

The carcass 6 is composed of a main body portion 7 extending from the tread part 3 through the sidewall parts 4 to the bead cores 5 of the bead parts 3, and turned up portions 9 each turned up around the bead core 5 from axially inside to outside of the tire and extending to outside in the radial direction of tire. And the height H1 of the front end of the turned up portion 9 from the heel end J is defined in a range of 2.7 to 4.0 times the height HF of the rim flange 13 of the rim 14.

Both the first reinforcement layer 10 and second reinforcement layer 11 are formed by disposing reinforcement cords made of steel in parallel. And by arranging the reinforcement cords so as to cross with the carcass cords of the carcass 6, the first and second reinforcement layers 10, 11 reinforce the carcass 6, and cooperate with the carcass 6 to exhibit a hoop effect, thereby increasing the rigidity of the bead part 2.

The first reinforcement layer 10 wrapping the carcass 6 is composed of an inside part 16 standing up along the inside surface of the main body portion 7 in the axial direction, and an outside part 17 adjoining to the inside part 16 and standing up along the outside surface of the turned up portion 9 in the axial direction. And the height H2 of the front end of the inside part 16 in the tire radial direction from the heel end J is in a range of 1.5 to 2.4 times the flange height HF.

The front end of the outside part 17 is, in this embodiment, lower than the front end of the turned up portion 9 of the carcass 6, and the difference is about 5 to 15 mm.

In the conventional tire, when the reinforcement layer is disposed outside the carcass, the reinforcement layer is higher than the front end of the turned up portion of the carcass, that is, the front end part of the turned up portion is covered by the reinforcement layer, but in this embodiment, to the contrary, the front end of the turned up portion 9 is projected above the reinforcement layer 10.

The second reinforcement layer 11, of which lower region is disposed between the inside part 16 and the main body portion 7, extends from the positions, at which height in the radial direction is approximately same as that of the bead heel end J, along the main body portion 7 of the carcass 6, so as to form the overlapping portion 19 which overlaps with the inside part 16 of the first reinforcement layer 10 with an overlapping width of at least 10 mm.

The ratio H3/H1 of the height H3 of the front end of the second reinforcement layer 11 from the heel end J to the height H1 of the turned up portion 9 of the carcass 6 in the radial direction is in a range of 1.2 to 1.6.

If the ratio H3/H1 exceeds 1.6, before the front end of the turned up portion 9 separates, the front end of the second reinforcement layer 11 is peeled. If the ratio H3/H1 is less than 1.2, peeling is likely to occur at the front end of the turned up portion 9, and the durability of the bead part 2 is not enhanced.

The thickness of the rubber at both sides of the front end of the turned up portion 9 of the carcass 6 is defined.

That is, in this invention, the intermediate part rubber thickness G1 which is the distance between the front end of the turned up portion 9 and the main portion 7 in the direction orthogonal to the turned up portion in a range of 0.85 to 1.1 times the rim flange height HF. And the ratio G1/(G1+G2) of the intermediate rubber part thickness G1 to the sum of the intermediate rubber part thickness G1 and the outside rubber thickness G2 which is the distance between the front end of the turned up portion 9 and the outside surface 20 of the bead part 2 in the direction orthogonal to the turned up portion in a range of 9 is 0.50 to 0.60.

Therefore, the front end of the turned up portion 9 is positioned approximately at an intermediate position of the distance from the main body portion 7 of the carcass 6 to the outside surface 20 of the bead part 2, and there is an intervening rubber layer axially inside and outside of the front end of the turned up portion 9 in an approximately same thickness.

If the ratio is less than 0.50 or exceeds 0.60 peeling occurs at the front end part of the turned up portion 9, and the durability of the bead part is lowered.

In the invention, meanwhile, as indicated by single dot chain line in FIG. 2, a filler 26 made of nylon cord or other organic fiber cord may be disposed, if necessary, outside the first reinforcement layer 10. It, however, increases the tire weight.

EXAMPLE 1

A tire of tire size of 11R22.5 was mounted on a rim of 7.50×22.5, and inflated with 120% of specified internal pressure, and loaded with 250% of the maximum load specified in JIS, and the rim flange was heated to 115 deg. C. under in these conditions, the relation between the ratio H3/H1 and the durability was tested. At this time, the ratio K of the intermediate part rubber thickness G1 to (G1+G2) was set at 0.6 and 0.5.

$H2/HF=2.0$

Figure 3:
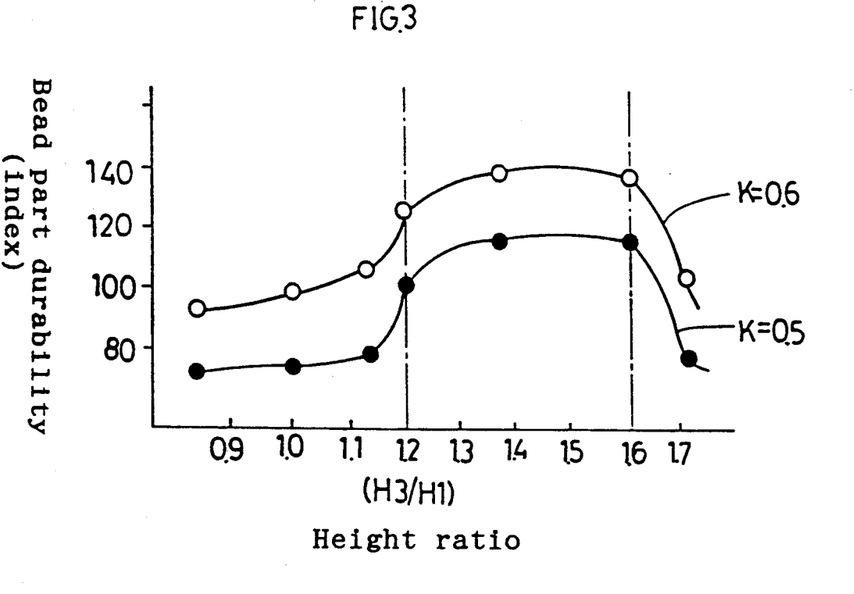
FIG. 3 is a graph showing the relation between the ratio of the height of the turned up portion front end of carcass to the height of the second reinforcement layer and the durability.
Figure 4:
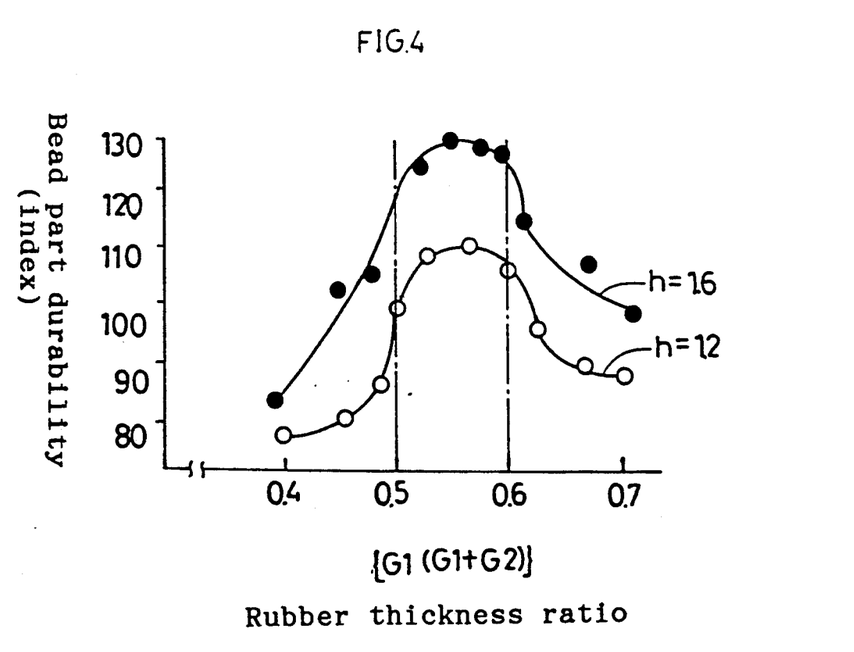
FIG. 4 is a graph showing the relation between the inside and outside rubber thicknesses at the front end of the turned up portion of the carcass and the durability of the bead part, FIG. 5 (a) to (f) are sectional views of the bead part showing the prior art.

The test results are shown in the graph in FIG. 3.

The test was conducted by using an indoor durability testing machine, and the time until the bead part was broken was measured, and was expressed in the index, supposing the performance of the conventional product with the ratio K of 0.6 and H3/H1 of 1.0 to be 100.

The greater the numeral, the better is the performance, and it is known that the range of composition of the application is superior to the others out of the range.

EXAMPLE 2

In the same size as in Example 1 and mounting on the same rim and testing in the same condition, the relation between the ratio G1/(G1+G2) and the durability was tested.

In the test, setting the height ratio H3/H1=h at 1.2 and 1.6 of high level, the time until the bead part was broken was measured, and was expressed as the index, supposing the product of which H2/H1 is 1.6 and G1/(G1+G2) is 0.7 to be 100.

The greater the numeral, the better is the performance, and it is found that the range of composition of the application is superior to the others out of the range.

Table 1 records the bead durability of the tires of the composition of the invention (Embodiments 1 to 5) and other tires (Reference 1 to 10), expressing in the index supposing Reference 1 to be 100. It is approved when the score is 200 or more.

|  | Embodiment 1 | Embodiment 2 | Embodiment 3 | Embodiment 4 | Embodiment 5 |
|---|---|---|---|---|---|
| Rim flange height (HF) mm | 12.7 | 12.7 | 12.7 | 12.7 | 12.7 |
| Carcass |  |  |  |  |  |
| Cord fineness | 7 × 4/0.175 | 7 × 4/0.175 | 7 × 4/0.175 | 7 × 4/0.175 | 7 × 4/0.175 |
| Turned up height (H1) mm | 34 | 44 | 40 | 51 | 51 |
| H1/HF | 2.7 | 3.5 | 3.1 | 4.0 | 4.0 |
| First reinforcement layer |  |  |  |  |  |
| Cord fineness | 4 × 4/0.175 | 4 × 4/0.175 | 4 × 4/0.175 | 4 × 4/0.175 | 4 × 4/0.175 |
| Outside part front end height (H) mm | 26 | 34 | 30 | 34 | 34 |
| Inside part front end height (H2) mm | 19 | 28 | 24 | 30 | 30 |
| H2/HF | 1.5 | 2.2 | 1.9 | 2.4 | 2.4 |
| Second reinforcement layer |  |  |  |  |  |
| Cord fineness | 4 × 4/0.175 | 4 × 4/0.175 | 4 × 4/0.175 | 4 × 4/0.175 | 4 × 4/0.175 |
| Front end height (H3) mm | 40.8 | 59 | 55 | 82 | 82 |
| Bottom end height mm | 0 | 7 | 3 | 3 | 3 |
| H3/H1 | 1.2 | 1.3 | 1.4 | 1.6 | 1.6 |
| Overlapping width of first and second reinforcement layers (l) mm | 19 | 21 | 21 | 27 | 27 |
| l/H3 | 0.5 | 0.4 | 0.5 | 0.3 | 0.3 |
| Intermediate part (G1) mm | 11.5 | 14.5 | 13.0 | 13.0 | 10.0 |
| Outside rubber thickness (G2) mm | 9.5 | 9.5 | 11.0 | 12.5 | 12.5 |
| G1/(G1 + G2) | 0.5 | 0.6 | 0.5 | 0.5 | 0.4 |
| G1/HF | 0.9 | 1.1 | 1.0 | 1.0 | 0.8 |
| Bead durability (index) | 205 | 210 | 250 | 205 | 200 |

|  | Reference 1 | Reference 2 | Reference 3 | Reference 4 | Reference 5 |
|---|---|---|---|---|---|
| Rim flange height (HF) mm | 12.7 | 12.7 | 12.7 | 12.7 | 12.7 |
| Carcass |  |  |  |  |  |
| Cord fineness | 7 × 4/0.175 | 7 × 4/0.175 | 7 × 4/0.175 | 7 × 4/0.175 | 7 × 4/0.175 |
| Turned up height (H1) mm | 40 | 33 | 52 | 40 | 40 |
| H1/HF | 3.1 | 2.6 | 4.1 | 3.1 | 3.1 |
| First reinforcement layer |  |  |  |  |  |
| Cord fineness | 4 × 4/0.175 | 4 × 4/0.175 | 4 × 4/0.175 | 4 × 4/0.175 | 4 × 4/0.175 |
| Outside part front end height (H) mm | 30 | 30 | 30 | 30 | 30 |
| Inside part front end height (H2) mm | 24 | 24 | 24 | 18 | 32 |
| H2/HF | 1.9 | 1.9 | 1.9 | 1.4 | 2.5 |
| Second reinforcement layer |  |  |  |  |  |
| Cord fineness | — | 4 × 4/0.175 | 4 × 4/0.175 | 4 × 4/0.175 | 4 × 4/0.175 |
| Front end height (H3) mm | — | 50 | 68 | 68 | 68 |
| Bottom end height mm | — | 3 | 3 | 3 | 3 |
| H3/H1 | — | 1.5 | 1.3 | 1.4 | 1.4 |
| Overlapping width of first and second reinforcement layers (l) mm | — | 21 | 21 | 15 | 29 |
| l/H3 | — | 0.4 | 0.3 | 0.2 | 0.4 |
| Intermediate part (G1) mm | 13.0 | 13.0 | 13.0 | 13.0 | 13.0 |
| Outside rubber thickness (G2) mm | 11.0 | 11.0 | 11.0 | 11.0 | 11.0 |
| G1/(G1 + G2) | 0.5 | 0.5 | 0.5 | 0.5 | 0.5 |
| G1/HF | 1.0 | 1.0 | 1.0 | 1.0 | 1.0 |
| Bead durability (index) | 100 | 190 | 180 | 175 | 180 |

|  | Reference 6 | Reference 7 | Reference 8 | Reference 9 | Reference 10 |
|---|---|---|---|---|---|
| Rim flange height (HF) mm | 12.7 | 12.7 | 12.7 | 12.7 | 12.7 |
| Carcass |  |  |  |  |  |
| Cord fineness | 7 × 4/0.175 | 7 × 4/0.175 | 7 × 4/0.175 | 7 × 4/0.175 | 7 × 4/0.175 |
| Turned up height (H1) mm | 40 | 40 | 40 | 40 | 40 |
| H1/HF | 3.1 | 3.1 | 3.1 | 3.1 | 3.1 |
| First reinforcement layer |  |  |  |  |  |
| Cord fineness | 4 × 4/0.175 | 4 × 4/0.175 | 4 × 4/0.175 | 4 × 4/0.175 | 4 × 4/0.175 |
| Outside part front end height (H) mm | 30 | 30 | 30 | 30 | 30 |
| Inside part front end height (H2) mm | 27 | 24 | 24 | 24 | 24 |
| H2/HF | 2.1 | 1.9 | 1.9 | 1.9 | 1.9 |
| Second reinforcement layer |  |  |  |  |  |
| Cord fineness | 4 × 4/0.175 | 4 × 4/0.175 | 4 × 4/0.175 | 4 × 4/0.175 | 4 × 4/0.175 |
| Front end height (H3) mm | 45 | 55 | 55 | 55 | 55 |
| Bottom end height mm | 0 | 3 | 3 | 3 | 3 |
| H3/H1 | 1.1 | 1.4 | 1.4 | 1.4 | 1.4 |
| Overlapping width of first and | 27 | 21 | 21 | 21 | 21 |

| -continued | | | | | |
|---|---|---|---|---|---|
| second reinforcement layers (l) mm | | | | | |
| l/H3 | 0.6 | 0.4 | 0.4 | 0.4 | 0.4 |
| Intermediate part (G1) mm | 13.0 | 11.5 | 11.5 | 10.2 | 15.0 |
| Outside rubber thickness (G2) mm | 11.0 | 17.5 | 5.0 | 10.2 | 10.0 |
| G1/(G1 + G2) | 0.5 | 0.4 | 0.7 | 0.5 | 0.6 |
| G1/HF | 1.0 | 0.9 | 0.9 | 0.8 | 1.2 |
| Bead durability (index) | 178 | 180 | 180 | 175 | 150 |

I claim:

1. A tire and rim combination comprising:

a rim, said rim including a bead seat part and a flange extending radially outward from the axis of said rim; and a tubeless tire, said tire including 15° taper bead parts of which each base bottom surface to be seated on the bead seat part reduces in inside diameter at a 15 deg. taper inward in the axial direction from a bead heel end J, a carcass having a main body portion extending from a tread part through sidewall parts to a bead core in each of said bead parts, and a pair of turned up portions, one of said pair of turned up portions turned up around each of the bead core from axially inside to outside and extending radially outwardly;

a first reinforcement layer of steel cords having an inside part, the inside part extending at the bead part along an axially inner surface of the main body portion, and an outside part, the outside part being contiguous to the inside part and extending along an axially outer surface of the turned up portion;

a second reinforcement layer of steel cords extending outwardly in the tire radial direction along the main body portion from a radial position substantially level with the bead heel end J, and of which a lower region is interposed between the inside part of the first reinforcement layer and the main body portion so as to form an overlapping portion with the inside part of the first reinforcement layer, wherein the width l of the overlapping portion is in a range of 0.3 to 0.5 times the height H3 of the upper end of the second reinforcement layer in radial direction from the bead heel end J, the height H1 of the upper end of the turned up portion in radial direction from the bead heel end J is in a range from 2.7 to 4.0 times the flange height HF of said flange.

the height H2 of the upper end of the inside part of the first reinforcement layer in the radial direction from the bead heel end J is in a range from 1.5 to 2.4 times the flange height HF, and the ratio H3/H1 of the height H3 to the height H1 is in a range from 1.2 to 1.6; and an intermediate rubber part interposed between the main body portion and the turned up portion in each of the bead parts, the thickness G1 of the intermediate rubber part, which is the distance between the upper end of the turned up portion and the main body portion in the direction orthogonal to the turned up portion, is in a range from 0.9 to 1.1 times the flange height HF, and the ratio G1/(G1+G2) of the thickness G1 of the intermediate rubber part to the sum of the intermediate rubber part thickness G1 and the outside rubber thickness G2, which is the distance from the upper end of the turned up portion to the outside surface of the bead part in the direction orthogonal to the turned up portion, is in a range from 0.50 to 0.60.

* * * * *